United States Patent [19]

Stoll et al.

[11] Patent Number: 4,526,827
[45] Date of Patent: Jul. 2, 1985

[54] PROCESS AND APPARATUS FOR PRODUCING ADAPTER BLOCKS FOR SYSTEMS WORKING WITH FLUID UNDER PRESSURE

[76] Inventors: Kurt Stoll, Lenzhalde 72, 7300 Esslingen, Fed. Rep. of Germany; Hans-Heinrich Glättli, Seestr. 252, CH-8700 Küsnacht, Switzerland

[21] Appl. No.: 486,615

[22] Filed: Apr. 20, 1983

[30] Foreign Application Priority Data

Apr. 29, 1982 [DE] Fed. Rep. of Germany ....... 3215883

[51] Int. Cl.³ ............................................. B29D 27/04
[52] U.S. Cl. ...................................... 428/137; 249/64; 249/176; 264/45.5; 264/46.4; 285/137 R; 425/817 R; 428/316.6
[58] Field of Search ............... 264/45.5, DIG. 83, 227, 264/50, 46.4, 46.7; 249/176, 177, 64; 52/309.4; 285/137 R; 428/137, 316.6; 425/817 R

[56] References Cited

U.S. PATENT DOCUMENTS

| 2,392,804 | 1/1946 | Basolo | 264/227 |
| 2,691,189 | 10/1954 | Bethe et al. | 249/176 X |
| 2,780,946 | 2/1957 | McGuire | 249/64 X |
| 3,112,164 | 11/1963 | Phillips et al. | 264/227 |
| 3,316,595 | 5/1967 | Kordiak | 249/176 X |
| 3,384,335 | 5/1968 | Schwarz | 249/64 X |
| 3,462,776 | 8/1969 | Cox | 264/50 X |
| 3,561,181 | 2/1971 | Bassett | 52/309.4 |
| 3,820,828 | 6/1974 | Fiddler | 285/137 R |
| 4,154,786 | 5/1979 | Plasse | 249/64 X |
| 4,208,368 | 6/1980 | Egli | 264/DIG. 83 |

FOREIGN PATENT DOCUMENTS

| 234371 | 1/1960 | Australia | 249/176 |
| 6270 | 1/1980 | European Pat. Off. | 264/45.5 |
| 349408 | 11/1960 | Switzerland | 264/227 |
| 2101925 | 1/1983 | United Kingdom | 264/45.5 |

Primary Examiner—Philip Anderson
Attorney, Agent, or Firm—Flynn, Thiel, Boutell & Tanis

[57] ABSTRACT

The invention relates to a process and apparatus for manufacturing adapter blocks with channels and making a mold system for producing the blocks. The adapter blocks have channels in at least one surface and connection openings running through the thickness of the blocks.

For forming the connection openings the mold has anchoring pins and it is designed for producing more than one adapter block at a time. The casting material is supplied into the mold from below and along one long side thereof. Gasket plates with nipples are placed on the connection side or sides, such nipples being received in conical connection openings.

11 Claims, 3 Drawing Figures

PROCESS AND APPARATUS FOR PRODUCING ADAPTER BLOCKS FOR SYSTEMS WORKING WITH FLUID UNDER PRESSURE

FIELD OF THE INVENTION

The present invention relates to a way of producing adapter blocks which have pressure fluid ducts therein and which have in one side thereof open channels joined up with connection ducts running generally normal to this side, using a process in which an integral foam material is foam molded in a negative mold of the adapter block and becomes solid and after curing of the integral foam material the connection face with the channels therein is machined so as to be fully plane. Furthermore the invention relates to a useful further development of the foam material mold which is specially useful for undertaking the process of the invention. This mold may be made up of a first mold end part having negative forms for producing the channels in the side of the adapter block, a second mold end part that has pockets for taking up negatives of the connection ducts of the eventual adapter block, furthermore mold pins seated in the second mold end part, and a frame-like inbetween part that may be gripped fluid tightly between the two mold end parts. Lastly the present invention relates to a way of producing this apparatus.

BACKGROUND OF THE INVENTION

The present application is based on certain details of the invention covered by U.S. patent application Ser. No. 385,245, filed June 4, 1982, herein referred to as the earlier application. Such an adapter block for pneumatic and/or hydraulic switching elements with integrated connection is made up of at least two plates or layers of which at least one is made of synthetic resin foam; furthermore at least one plate has fluidways therein in the form of channels and/or through openings running all the way through the thickness of the plate of foam material, such openings ending partly in at least one channel. On the block itself it is possible to have switching elements that may be static, semistatic or dynamic, and are adhesively or otherwise fixed in position. Lastly the block will have means for the connecting up of fluid pipes such as male parts over which a hose may be slipped, screw connectors, multiple connection parts and so on that are for example bonded in or on the block. It will be seen from this that an adapter block is made up of blocks or plates with integrated connections, on which air-power or liquid-power elements may be fixed and which may be joined up by way of separate connections or terminals or multiple connectors with the supply system and/or peripherals. The production of the adapter blocks, used for connection of standardized pressure fluid connections with active and passive pressure fluid elements takes place, as noted hereinbefore, by supplying integral foam into a foaming mold of the desired design so that foaming molding may take place and, after curing, the connection sides of the adapter block are mechanically worked or machined to make them plane. This step has the effect of machining away the compact zone—that is to say the skin that is formed right next to the moldface—so that the face of the block will now be formed by a section cutting through the foam openings or cells of the material, this making the material rougher and making bonding thereof simpler. At the same time the side of the material is, as noted, made plane. The connection between the pressure fluid terminals and the pressure fluid components is produced having channels and possibly through openings in at least one plate of the block. This may be done by designing so that such channels and openings are produced on molding and in the case of through openings being necessary, pins may be used in the negative mold at points on a grid as desired. The first tests undertaken under working conditions have made it clear that on the one hand the price of manufacturing may then be greatly cut down while at the same time the quality is increased and it has become clear that, judging from development so far, the outlook is good with respect to the making of further headway in the design of foam molds and the general process of production.

SUMMARY OF THE INVENTION

For this reason one purpose of the invention is that of making a further development of the invention as disclosed in the earlier patent application. Such a general purpose is on the one hand based on the thought of working out further forms of the mold for producing foam material components and furthermore producing the mold and the adapter block itself.

In connection with the design of the mold this purpose is effected inasfar by designing the mold pins with anchoring means at one end. On using such a design it becomes possible for the tolerance range on producing the casting mold to be increased. At the start of experiments in connection with the invention it seemed likely that there was some danger of the mold pins, which have the purpose of producing openings between the channels and the deeper levels of the block, pressing strongly against the fins used for creating the channels of the negative mold, or of their not making contact therewith. In the last-named case this would be responsible for skin-like flash being formed, which has to be cut off in a separate fettling operation to make certain that flow of air through the adapter block would not later be cut off or choked in any way. The use of such anchoring pins then not only makes later fettling or machining operations unnecessary, but furthermore even makes inspection of the components after molding unnecessary, because the through openings would only be more or less stopped up if the mold was quite obviously out of order in some way and this would hardly be overlooked on opening the mold. A further point is that shortcomings are taken care of inasfar as in the prior art the pins were positioned in the mold by way of perforated plates so that the press became higher in price and retooling took a long time. In fact, each grid size has to have its own separate perforated plate, and a generally complex operation had to take place if through openings were to be produced which had a cross section different from that for which the grid was designed. On the other hand, anchoring pins are not dependent on any sort of grids and they make it very simple to make changes in the size and form of the cross section of the through openings.

As part of a further development of the invention the foam mold is so designed that it can make a number of adapter blocks so that more than one adapter block may be produced in a single working step. The useful effect in connection with this is that the price of production may be cut down, such costs in fact being dependent on the residence time in the foam mold in the press. The production of a number of single plates in one shot of the press would not make for any increase in plant costs for getting further presses. In addition the storing and handling of the material would be simpler and from each single workpiece it would be possible for the desired number of copies to be run off automatically.

A further useful effect is to be had if the overall thickness of the plate or layers is equal to about 1.5 to 2 times the depth of the channels on one side thereof and 2.5 to 3 times this depth for cases in which there are channels on both sides of the plate. Products designed on these lines are strong enough.

As part of a further useful development of the invention the layer or plate having channels in only one of its two sides has a thickness of 6 to 8 mm. If on the other hand it has channels in both its sides the thickness is best in a range of 10 to 12 mm. The upper limit for this range is dependent on the flow properties of the foaming mass on being supplied into the mold and the process of "rising" then taking place at the time of foaming. Because of the fins in the mold used for forming the channels, the liquid let into the mold only has a limited cross section, in which there are many sudden changes, for flow through the mold. This being so, there are necessarily high flow speeds and eddying effects so that there is a danger or air being trapped in the mold space. Tests run under working conditions have made it clear that for a plate thickness of 6 mm—as a rule the depth of the channels is about 4 mm—the amount of waste produced is so low as to be unimportant. A plate thickness of 8 mm has further useful properties over and above those of a 6 mm plate: there is in fact a great decrease in the flow speed; for assembly with connection bush rails at the end face no second plate thickness is necessary and the upper limit to the size of the product that may be made is stepped up to 200 by 300 mm and more. An increase of the thickness of the plate past these values makes for very much longer pressing times. The pressing times are to be kept as short as possible, because the price of manufacture is highly dependent thereon. The figures given so far herein relate to the layers or plates of the sort having the channels only in one side thereof. On the other hand in the case of plates having channels in both their sides, because of the facts gone into so far, the best range is 10 to 12 mm for the thickness.

In one working example of the invention the negatives of the connection holes are of conical shape. The useful effect in this connection is to be seen more specially in the case of a gasket plate—of which a more detailed account will be given hereinafter—that has nipples thereon.

A still further useful effect is to be had if the foam mold is produced from cast resin so that the price of the mold is lower than in the case of a metal mold and mold handling becomes simpler.

A further fact in this connection is that the compact zone is thinner so there is the useful effect that less material has to be taken off by machining in order to get a rough enough outer face. This makes for better bonding and the tolerances with respect to putting on the bonding material are greater.

In keeping with a further part of the invention, the production of the foam mold may be done by putting anchoring pins of the right length in the holes of the master positive so that on casting the negative mold they are embedded in the cast material by their anchoring ends or heads. A process in which the negative mold is produced using anchoring pins in place of mold pins which are generally positioned in keeping with a standard grid is simpler, the use of anchoring pins offering as we have seen a large number of useful effects.

It is best for the casting of material into the master mold, that is to say the production of the negative mold, to be undertaken under vacuum and for the corners and edges of the master positive to be brushed over with casting resin before casting is undertaken, this stopping air bubbles being trapped in the mold.

The measures of the invention to be put forward hereinafter relate to further developments of the process for making adapter blocks having pressure fluid channels. It is best for the first step to be that of running the integral foam material upwards and/or along a long side into the foam mold. The outcome of this is that the flow speed may be kept relatively low so that there is hardly any danger of eddying effects and for this reason the amount of waste produced will be low. This form of the process makes it possible for adapter blocks with the lowest possible thickness to be manufactured, this being important inasfar as the thickness of the plate or layer is controlling for the press residence time and this in turn is generally controlling for the production costs. Such costs are more specially low when the thickness is made as low as possible.

While it is true that the foaming process makes possible a relatively low mold shutting force of about 5 bar, a low working temperature of at the most 60° C. and low flow forces within the mold, the polyurethane resin as a special material gives a number of useful effects for a number of reasons. In fact polyurethane is very resistant to glycerol and gasoline and other mineral oils, vegetable oils and ozone. It has good mechanical properties: a high enough strength, elasticity and freedom from strains. It is resistant to changes in temperature and to low temperatures. And there is no embrittlement with age. The mold does not have to be very strong for casting such foaming material, that is to say low mold costs may be counted on.

As a more specially simple form of the process of the invention for producing the adapter blocks at least one of the connection sides is so designed that the connectors and/or the switching elements to be fixed thereon may be fixed in position using a gasket and without the base plates of phenolic resin as are usually bonded onto the blocks. While it may be true that the design used so far kept to all technical conditions fully, it has the shortcoming of being relatively high in price inasfar as the costs for such base plates are of the same order as the costs of the adapter block itself and the labor costs are put up by about 5 to 25%. Normally a gasket plate, more specially in the case of certain components, has to be put under a relatively high pressure if it is to give its full effect. There is then the danger that the gasket plate will make dents in the layer and there will then be leaks, and furthermore the assembly screws have to be well anchored in view of the large forces produced.

A further useful effect is produced if the gasket plate has flexible nipples on both its sides at those points where there are the openings of the holes so that when the gasket plate is put on the adapter block, the nipples are taken up in the holes in the adapter block and/or in the holes of the fluid pressure component to be fixed in position thereon. In this respect the nipple structures are best of such a size that when they have been moved into the holes they are elastically strained or pre-stressed. In this respect a useful effect is to be had if the holes, as claimed in said patent application, are made with a conical shape, so that on the one hand it is simpler for the nipples to be slipped into the holes in the first place and on the other hand any errors in the spacing of the nipples or holes will be of little account. When the system is put under pressure the nipple structures are more strongly pressed against the inner faces of the conical holes so that there will be an increase in the sealing effect (positive sealing effect). Because the nipple structures on the gasket place are elastically strained, errors in the spacing of the holes, which are to be in line, may be simply taken care of, more specially if the holes are conical. Such a conical form of the holes furthermore makes it simpler for the nipples to be slipped into the holes in the gasket place.

As a material for producing the gasket place, in addition to widely used elastomers as for example Perbunan and Neoprene, polyurethane may be used with good effect. This material is able to take care of relatively small elastic bending of the nipples on the gasket plate and furthermore is resistant enough to the effect of oil. It has good sliding properties and a relatively large rate temperature range.

DETAILED DESCRIPTION

Figure 1:
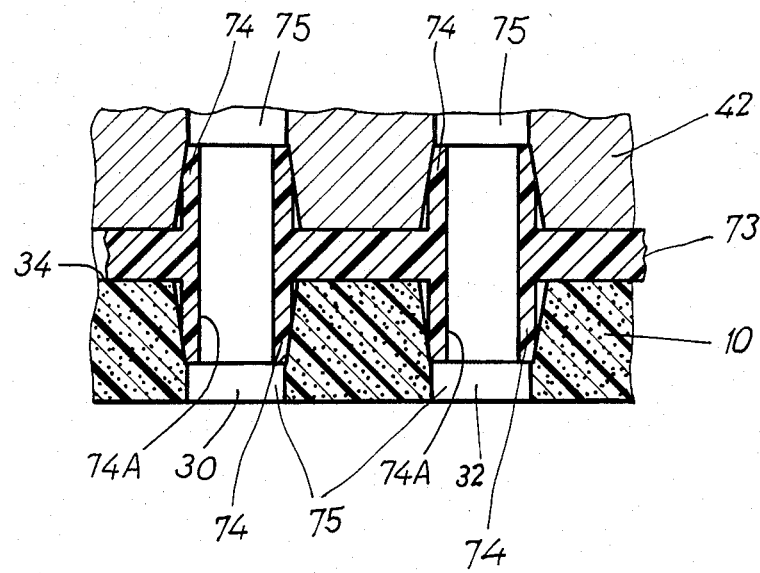
FIG. 1 is a fragmentary sectional side view of an adapter apparatus embodying the present invention, including an adapter block, a connector part, and a sealing plate therebetween.

The adapter block 10, that is best made of polyurethane, will be seen from FIG. 1 to have two connection holes or bores 30 and 32 that are coned, or in other words have conical end portions. Because the adapter block 10 is viewed in the fitted or assembled condition, the pressure fluid component or connector part 42 connected thereto is to be seen as well. This component as well has connection bores or holes 75, that are placed in line with the connection holes 30 and 32 of the adapter block 10. Between the adapter block 10 and the fluid component 42 there is a gasket or sealing plate 73, that has nipples or projections 74 sticking out from both sides thereof, the nipples being of such a size as to make a good fit in connection holes 30 and 32 and in holes 75, lined up therewith, in the fluid pressure component 42. In this respect the nipples 74 are of such a size that when slipped into the coned connection holes 30 and 32 and the holes 75 they are somewhat strained by being pressed radially inwardly at their ends, such stress then at the start giving the desired sealing effect. When later the system is put under pressure the nipples 74 are forced right up against the inner faces of the connection holes 30 and 32 in the one case and of the holes 75 in the other so that a very good sealing effect may be produced. In the sealing condition the gasket plate 73 is disposed right up against the connection or sealing face 34 of the adapter block 10.

Such a fluid tight sealing connection between the face of the gasket plate 73 right on the connection face 34 of the adapter block 10 or of the connection face of the switching element 42 is not necessary. This is because of the fact that the nipples 74 have such a thick wall at their base ends that a small gap may be bridged over by them without bursting. The thickness of the material of the nipples 74 is for this reason to be such that they are strong enough at their root or base ends while on the other hand their outer ends are able to be moved to some degree with a bending effect. Passageways 74A through the nipples 74 and plate 73 provide fluid communication between each hole 30 or 32 and the associated hole 75.

The present design to be seen in FIG. 1 makes possible the use of coupling parts which, but for numbering in the case of parts that have more than one row of connections, are the same in every respect.

Because the sealing effect is produced at the ends of the nipples 74, forces having the tendency of pushing the switching element away from the block or pushing two coupling parts away from each other are generally limited to the sum of the clearance cross sections of the connections in the case of an element or a coupling. The overall force effect is not only much smaller than compressive forces acting over a greater area in the case of prior art seals, but furthermore is only a small part of the force that is necessary to give such a deformation of prior art seals that they take effect over all of the desired sealing face. It is for this reason that the forces needed for assembly are cut down to values that may readily be produced by using plate fixing screws in a polyurethane foam material.

The polyurethane foam molding process is taken into account as a possible process for use in the present invention because it seemed at the time it would be a way of cutting down the price of manufacturing assembly plates and blocks with integrated connections while at the same time increasing the quality. Work undertaken so far has been directed to this use; in fact a number of different further uses ranging from the production of guard caps for control blocks with integrated connections to the production of pneumatic switching elements seem to be possible.

The present process of reasoning is more specially directed to the possible production of plates with different thickness and different formats, the design of molds and bonding. The account now to be presented will make some of the most important points in this connection clear.

(a) The thickness and format of the plates:

In the first place tests were made in connection with plate thicknesses between 6 and 8 mm. The limits to this range are fixed by the flow events taking place when the foaming material is supplied into the mold and on later "rising" at the time of foaming. In comparison with the production of known parts, as for example housings, with a wall thickness of the same order, special shortcomings are experienced because of the relatively high fins necessary for molding the channels: there is a limited cross section for the flow of the liquid (as for example with a plate thickness of 6 mm less the channel depth of 4 mm, gives a flow cross section of 2 mm) while at the very same time there are sudden changes in cross section. The necessarily increased speeds of flow and eddying effects may well make it likely for air to be trapped.

On the footing of knowledge so far it is possible to make certain statements. Firstly: a format or size of 160 by 220 mm with a plate thickness of 6 mm (and a channel depth of 4 mm) may be produced with a very low waste rate. A condition is that the material be forced into the mold from below and along one long side in order to keep down the flow speed. In this respect it is however necessary for the adjustment of conditions to be exactly worked out and then to be used regularly. However a plate thickness of 7 mm gives certain useful effects: the flow speed is cut down by 33% and for assembly blocks with connection bushing rails it is not necessary to have any second plate thickness. Now that aluminum plate material with a thickness of 7 mm has come to hand, there will now be nothing stopping the use of this design. It would seem highly probable that the maximum format may then be increased to 200 by 300 mm (roughly the same as A 4 paper) without the adjustment of the machine and the outside conditions becoming highly tricky.

The interest in larger formats or sizes of plates is because the residence time in the press is an important factor in plate manufacturing costs; that is to say it would be possible to get a great decrease in such costs if, at least in the case of the smaller sizes of blocks, all the separate plates might be foam-molded in a single working operation. More specially, no further plant cost in the form of further presses would be necessary. A further point would be the simpler warehousing and handling of the molds, and from each single plate an equal number of workpieces would be produced automatically. Furthermore it is specially in connection with the possible foam molding of, as far as possible, all the single plates at the same time in one single shot that changing over to a single standard size of plate with a thickness of 7 mm would be rewarding inasfar as the mold and the placing in position of the pins therein (inasfar as they are still necessary, see hereinafter) would become simpler.

A plate thickness of 10 to 12 mm makes for very much longer pressing times. Assembly blocks that are fitted with components and the like on one side only and having connection rails at one end thereof are for this reason frequently fitted with a special lowermost plate: this is because if the lowest channel plane is at the same level as the lower row of bushes, the lowest plate would have to be 14 mm thick, this being greater than the value noted hereinbefore. It is for this reason that most of the area of the lower face is so deeply hollowed out that the rest of the thickness is only about 7 mm. This is best done with standard ready-made parts, because at the time of later bonding lower supports are needed.

The statements made so far are in connection with plates having channels on only one side; presently there is little to go by with respect to the question of using plates with channels in both sides, which in many cases give useful effects. It would seem likely that the lower thickness limit of 10 mm would hardly be great enough for the upper format size noted last. Because however the thickness of the zone without any channels might readily be stepped up to 6 mm, it would seem quite likely that the plates with channels on both sides in the largest format noted might be made with an overall thickness between 10 and 12 mm.

(b) Mold design:

For the best mold design it seems that the polyurethane foam molding may well be used because of certain useful effects:

1 the low mold shutting force of about 5 bar,
2 the low temperature needed of 60° C. at the most and
3 the low hydrodynamic forces within the mold.

It is because of these facts that the parts responsible for the mold effect as such may readily be made of casting resin, such molds then outdoing metal molds furthermore inasfar as in the case of integral foam the compact zone or skin will be thinner. A low thickness of the compact zone is useful inasfar as only a small amount of material has to be machined away in order to get a porous or cellular surface. Such a cellular surface makes possible greater tolerances on putting on the bonding adhesive and gives a more powerful bonding effect.

From the time the process was used for the first time in the art till a short time back, only general purpose molds have been used. A patent application has been made in respect of the process in question and a detailed account has been given thereof in the application. The useful effect was to be seen in the freedom from risks and in the accuracy of the placing of the holes in the foam-molded plates. The shortcoming was to be seen in the relatively long retooling times and the increase in price of the press because of the complex perforated plate and the large number of pins. In addition, for each grid (for example for the 1000 system, the M 5 system and so on) a separate perforated plate had to be used and the use of an element with a different basic grid on one and the same block is limited to one side of the block that has fittings on both its sides, if no special steps are taken. Furthermore special further steps have to be taken in the case of through holes with a cross section larger than that in keeping with the grid used (the selection of the cross sections of the channels is naturally quite free in all cases).

The latest development is one in which the top part of the mold is such that the holes in the channel plates are produced by pins, that are fixed in their positions in the mold plate. To this end mold pins or rivets of the right length are slipped into the holes of the model or master positive and on casting the negative mold their heads become embedded in the casting material.

Figure 2:
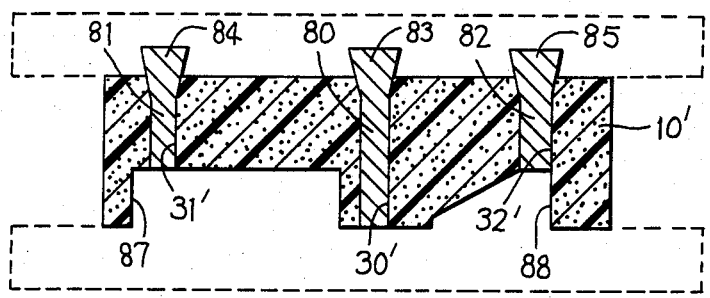
FIG. 2 is a sectional side view of a model of the adapter block of FIG. 1 and plural mold pins which are each disposed in a respective bore provided through the model.
Figure 3:
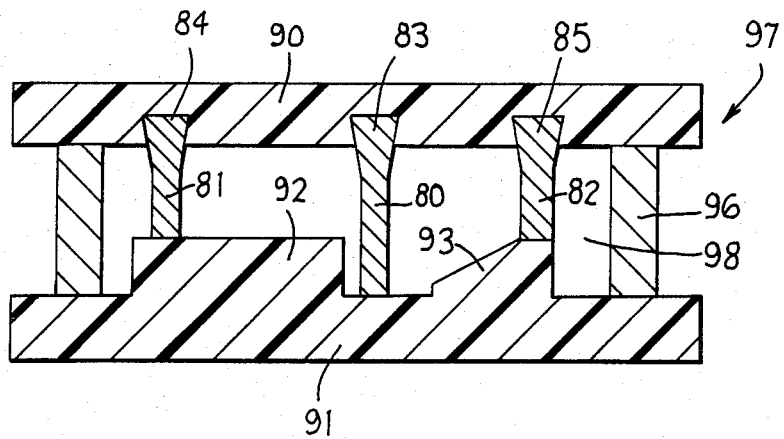
FIG. 3 is a sectional side view of a mold for making the adapter block of FIG. 1.

More specifically, as shown in FIG. 2, a master or model 10' of the adapter block 10 is made from a material such as Delrin, has recesses or channels 87 and 88 in the underside thereof, and has plural holes or bores 30', 31' and 32' therethrough which each have a conical portion at the upper end thereof. Mold pins 80, 81 and 82 which respectively conform in shape to the holes 30'–32' are inserted in these holes, and have anchoring ends 83, 84 and 85 which project upwardly past the upper surface of the model 10'. A moldable synthetic material is then applied in a vacuum to the upper and lower sides of the model 10', as shown in broken lines in FIG. 2, and is allowed to harden, the anchoring ends 83, 84 and 85 of the mold pins becoming embedded in the moldable material. The apparatus is then removed from the vacuum and the moldable material and pins 83–85 are separated from the model 10', yielding an upper mold end part 90 (FIG. 3) having the pins 83–85 projecting downwardly therefrom and a lower mold end part 91 having thereon upward projections 92 and 93 provided by the recesses 87 and 88 in the model 10'. A framelike intermediate part 96 is provided between the mold end parts 90 and 91 so as to surround the pins 80–82 and projections 92 and 93, the end parts 90 and 91 and the intermediate part 96 defining a mold 97 having a mold cavity 98 therein which is a complement of the adapter block 10.

On the one hand this process puts an end to all the shortcomings noted so far of the first form of the process and on the other hand makes possible greater tolerances in connection with make-ready work in connection with producing the casing mold. In the first place there was in fact the danger of the anchoring pins being responsible for an overly great pressure in the foam material plate on the fins used for molding the channels in the negative mold, or not making contact with them at all. In the second case thin skins or webs of flash would be produced stopping up the airways in the component, and a separate fettling operation was necessary.

It is certain that the new technology not only makes any later fettling unnecessary but even makes it unnecessary, by and large, for the plates to be inspected after foam molding operation, because if a through opening were stopped up in the molding or were not present at all, then the mold would have signs of obvious damage that would be seen at once. Such damage to or shortcoming in the mold would in fact be seen automatically on opening the mold.

It has become clear from further tests that chokes and ejectors for about 1 to 6 bar with a very small diameter of at least 0.5 mm may be directly foam molded or foam cast in the plates, by the use of pins. On using one mold with such pin it was possible to do a run of 50 workpieces without the least signs of damage.

Spaces for the purpose of distribution of feed air and for slowing down timer valves may readily be produced on foam molding, if an interconnected channel system, that may be a multiple one, is produced. The breadth of the channels is in this case not to be broader than the thickness of the plate and the webs or separating walls are to make possible a least breadth of 2.5 mm and a percentage of bonding area of at least 25%.

The pulling of foam molded plates out of the mold with the channels and the pins is to be done in the case of the formats used so far with the help of the sloping edge of the frame plate and probably with the help of "bonding", produced for a short time by the parting agent, between the foam mold plate and the lower plates of the press.

(c) Production of the master pattern and producing molds by casting:

The master pattern is generally speaking simple to make: The milling out of the channels and the drilling of the holes is best undertaken by optical copying from the drawing with a scale of 2:1 using an engraving machine. It is useful to have a pneumatic remote control system for lowering the miller and to have a chance of automatically drilling the holes.

It has turned out that Delrin plates or sheets are the best starting material, because such material makes possible a high feed rate, is responsible for hardly any resistance to motion of the pantograph and gives a smooth surface and channel edge finish. A further useful effect is that Delrin may be used without any parting or mold release agent when later casting the negative molds therein using polyurethane casting resin with two components.

While in the case of the first form of the process it was necessary to make use of special graph paper which kept its size as far as possible even when there were changes in temperature and humidity, in the new technology paper forms will be used with figures of the connections and with assembly outlines thereon. Because of their small size even large changes in the relative positions of the parts may be made because of the small size of the figures; on the other hand they do have to be fixed on a support or base which as far as possible keeps its size, as was necessary in the earlier system.

The production from the master mold by casting has to take place under vacuum so as to be certain that no bubbles are produced. Tricky parts of the mold are to be brushed over with casting resin for stopping air from being trapped.

Many molds may be cast from the master pattern. It would seem almost certain that more than a hundred copies may be produced. The costs for a casting will be, dependent on the format, about DM 80.-- to DM 120.--. If one goes by experience so far, the working life of a mold casting would be equal to 200 to 300 foam plates at least.

(d) The sealing system:

The present stage of development would still seem to be a long way off from the goal that may be later effected: On the one hand the properties of the material so far used are not fully known in order to make use of any practicable ideas that may have been worked out for making a simpler design of the blocks with integrated connections without any risks, while on the other hand there are clear ideas, even at this stage, as to how the sealing system might be changed to be in keeping with a new generation of elements and connection parts to give, once again, a marked decrease in costs.

So far the blocks for the elements that are to be fixed in position have been bonded to special base plates of phenolic resin, such plates not being deformed at all in the temperature range in question under the effect of the forces taking effect on screwing the elements in place. At the same time there is a distribution of the pulling forces produced by the fixing screws over a relatively large area.

This good quality design is however relatively high in price: The costs for the base plates are of the same order as the costs of the foam plates themselves and put up the labor costs by a further 5 to 25%.

At the time of writing there is some hope that we will be able to do without the base plates, but this is in no way certain. The main reason for this not being possible is that the seal, more specially under M 5 elements, has to be acted upon by a relatively high force to take full effect. On the one hand there is then the danger here of hollows being produced in the foam plate by the seal so that as time goes by there will be a leak because of the decrease in the pressing force, while on the other hand the fixing screws in the polyurethane plate will have to be well anchored to keep up with the acting forces.

So far there has been no clear outcome from the tests: It was possible to see that 2.9 mm chipboard screws when screwed for about 6.5 mm into the foam material were so strongly anchored that they were broken off if done up overtightly. The working life, more specially over a wide temperature range and for a long time, is so far unknown. The same is true of the hollows produced by the rubber seals.

Purely pneumatic forces having the tendency of forcing an element away from the assembly plate are relatively small: Taking the case of four connections under pressure with cross section 12.5 sq. mm, there will be a force of only 30N at a pressure of 6 bar. With a distribution of a force of this order between two screws the force may be taken up for a long time without any trouble. The purpose is for this reason that of designing a way of assembly and sealing while keeping the pressing force down to the said value as far as possible.

Not only the element that is to be fixed in position but furthermore the "base" plate both have markedly coned holes to take up the nipples on the sealing "plate". The diameter of these nipples is such that, after slipping them into the coned holes, the base parts of the nipples are somewhat strained or pre-stressed elastically. When the connection is put under pressure the nipple undergoes outward expansion and is pressed more strongly against the wall of the coned hole so that the sealing effect is increased to give a power sealing effect.

The cone-like form of the holes is important for a number of reasons: firstly, it is simpler for the nipples on the sealing "plate" to be slipped into position and the zone of the elastic stressing, whose level is dependent on the position in the tolerance range, is defined at a value which is not overly great, and lastly it is possible in this way for differences in the spacing to be taken care off without or with only a little elastic strain.

The coned holes may be directly produced during the foam molding process in the polyurethane plates, this being true as well for the core holes for the chipboard or Parker screws that are used for fixing the switching elements in place. It is naturally possible for the inner parts, needed for making certain that the elements are truly lined up, to be produced in the foam molding operation.

Because only a small degree of straining or deformation of the elastic nipples on the sealing plate is necessary, polyurethane elastomer may be used as a material for the seal. It is has the useful property of being resistant to the effect of oil, of having a low coefficient of friction and having a wide working temperature range.

The sealing system to be seen in the figure may furthermore be used for multiple connection parts. For each 22-port multiple connector it is possible to have the place of 22 male and female connection parts with their O-rings and 44 circlips taken by 44 simple press-fit male parts (such as part numbers 207,339 or 215,579), such press-fit male parts being put in place on injection molding or pressing the connection rails. But for the numbering of the connection, the two sides of a multiple connector are the same in all respects, while nevertheless being able to be plugged together only one way round.

Even at the present day there are P and I 22 port connection parts in the form of bush rails, that will very probably be able to be joined up and sealed with a low-price seal of an elastomer of the sort put forward hereinbefore. In fact for example it is possible for the 96 port double plug-fit part each with two O-rings, 5 keeper washers and 10 special-purpose screws for connection of the general purpose connection plate to have its place taken by the stepper switch control drawer FS-10 and for the place of the feed/indicator unit for connection of the plug-in function plate to have its place taken by only 5 such seals. Much the same may be said for the connection of the program plug-in plates (for example on the programmed insertion unit control), that make necessary 22 to 44 double plug-in male parts together with supporting parts.

However in view of the chances for further development as noted herein one has to keep in mind the fact that, particularly in the case of the designing of a new system of switch elements, many other conditions have to be kept to in order to make possible the design and production of assembly blocks with integrated connections. Such a purpose may only be effected by very close and long lasting cooperation between the development departments for switching elements and integration engineering.

A last point to be kept in mind is that it would be quite wrong for the foam molding process to be limited to producing channel plates. A first step has been taken in this respect starting from the first field of use inasmuch as on the one hand the storage space in the feed and indicator unit for the control of stepper switches and on the other hand a housing for a control block with integrated connection made of polyurethane integral foam have been produced. The two designs seem to be very economic, more specially from the mold casting angle, and in addition to being very strong are completely corrosion resistant.

In order to see that the housing mold costs are even better amortized, attempts have now been started at standardizing the formats of control circuits with integrated connections at least in groups so that in each case one housing may be used for a number of different circuits.

Tests run at temperatures down to $-28$ dec. C. have made it clear that there is no marked embrittlement, this naturally being true for the channel plates as well. There were only very small signs of denting (without any tearing or splitting) after they had been hurled down onto a stone floor: there was no damage to the bonds either.

The embodiments of the invention in which an exclusive property or privilege is claimed are defined as follows:

1. An adapter apparatus for use in a fluid system, comprising: an adapter block which is made of a structural foam having a foam core and a solid exterior skin integral with said foam core, and which has a recess provided in a first surface on one side thereof and a connecting bore extending therethrough from a second surface thereon to said recess in said first surface; a connector part which has a connecting surface spaced from and facing said second surface on said adapter block and which has a connecting bore extending thereinto from said connecting surface; a sealing plate disposed between said adapter block and said connector part, having sealing surfaces on opposite sides thereof which are respectively adjacent said second surface on said adapter block and said connecting surface on said connector part, having an outward projection on each side thereof, each said projection being disposed in and sealingly engaging a respective one of said connecting bores in said adapter block and said connector part, and having means defining a passageway through said projections and said plate which provides fluid communication between said connecting bores in said adapter block and said connector part.

2. The adapter apparatus according to claim 1, wherein said connecting bore in said adapter block has a diameter dimensioned so that the associated projection on said sealing plate is received therein with an elastic radial tension.

3. The adapter apparatus according to claim 1, wherein said connecting bore in said adapter block has a conical portion which is adjacent and diverges toward said second surface and which receives said projection.

4. The adapter apparatus according to claim 1, wherein said sealing plate is made of a polyurethane elastomer.

5. The adapter apparatus according to claim 1, wherein said adapter block has a plurality of said connecting bores therein; wherein said connector part has a plurality of said connecting bores therein; wherein said sealing plate has a plurality of said projections on each side thereof, each said projection being received in a respective one of said connecting bores in said adapter block and said connecting part; and wherein said sealing plate has a plurality of said passageways therethrough which each provide fluid communication between a respective one of said connecting bores in said adapter block and a respective one of said connecting bores in said connector part.

6. A method of making a mold for molding an adapter block which is adapted for use in a fluid system and which has a connecting bore therethrough, said mold having a mold cavity which is a complement of said adapter block and having a mold pin extending across said mold cavity, comprising the steps of: preparing a full-size model of said adapter block having a bore therethrough; thereafter inserting into the bore in said model of said adapter block said mold pin, said mold pin having an anchoring end; thereafter positioning said mold pin so that said anchoring end thereof projects outwardly from said adapter block; thereafter placing said model and said mold pin in a vacuum; thereafter casting a mold from said model in said vacuum by applying to said model and to said anchoring end of said mold pin a quantity of a moldable plastic material; thereafter waiting for said plastic material to cure, said anchoring end of said mold pin becoming embedded in said plastic material as it cures; removing said plastic material and said model from said vacuum; and separating said model from said plastic material and said mold pin, said plastic material and said mold pin being a part of said mold.

7. The method of claim 6, including prior to said casting step the step of applying a thin coating of a casting resin to the surface of said model in the region of corners and edges thereof.

8. The method of claim 6, wherein said casting step is carried out using a plurality of said models of said adapter block which each have a respective said mold pin in the connecting bore thereof, whereby said mold can be used to simultaneously make a plurality of said adapter blocks.

9. A mold produced in accordance with the method of claim 6.

10. A process for producing an adapter apparatus which is adapted for use in a fluid system, which has a channel provided in a surface thereon, and which has a fluid passageway extending therethrough and communicating with said channel, comprising the steps of: providing mold means defining a mold cavity which has a mold pin extending thereacross and which is a complement of an adapter block having a recess provided in a first surface thereon and having a connecting bore extending therethrough from a second surface thereon to said recess in said first surface; introducing into said mold cavity a quantity of a foamable synthetic resin; thereafter waiting while said foamable synthetic resin expands to fill said mold cavity and then solidifies, the portions of said foamable synthetic resin adjacent surfaces of said mold cavity and said pin forming an integral, solid skin around the remainder of said synthetic resin and said remainder forming a foam cure, the resulting object being said adapter block and said pin in said mold cavity defining said fluid channel therethrough; thereafter removing said adapter block from said mold cavity; and thereafter placing a sealing plate adjacent said adapter block, said sealing plate having a surface which is adjacent said second surface of said adapter block, having a projection thereon which extends outwardly from said surface thereof and extends into and sealingly engages surfaces of said connecting bore in said adapter block, and having a connecting bore which extends through said projection and communicates with said connecting bore in said adapter block; wherein said recess in said adapter block is said channel of said adapter apparatus, and said connecting bores in said adapter block and said sealing plate serve as said fluid passageway in said adapter apparatus.

11. An adapter apparatus produced according to the process of claim 10.

* * * * *

UNITED STATES PATENT AND TRADEMARK OFFICE
CERTIFICATE OF CORRECTION

PATENT NO. : 4 526 827
DATED : July 2, 1985
INVENTOR(S) : Kurt STOLL et al

It is certified that error appears in the above-identified patent and that said Letters Patent is hereby corrected as shown below:

Column 14, line 22; change "cure" to ---core---.

Signed and Sealed this

Seventh Day of January 1986

[SEAL]

Attest:

DONALD J. QUIGG

Attesting Officer

Commissioner of Patents and Trademarks